Jan. 15, 1924.
W. S. HUDSON
1,480,684
SPRING LINK
Filed Oct. 19, 1922
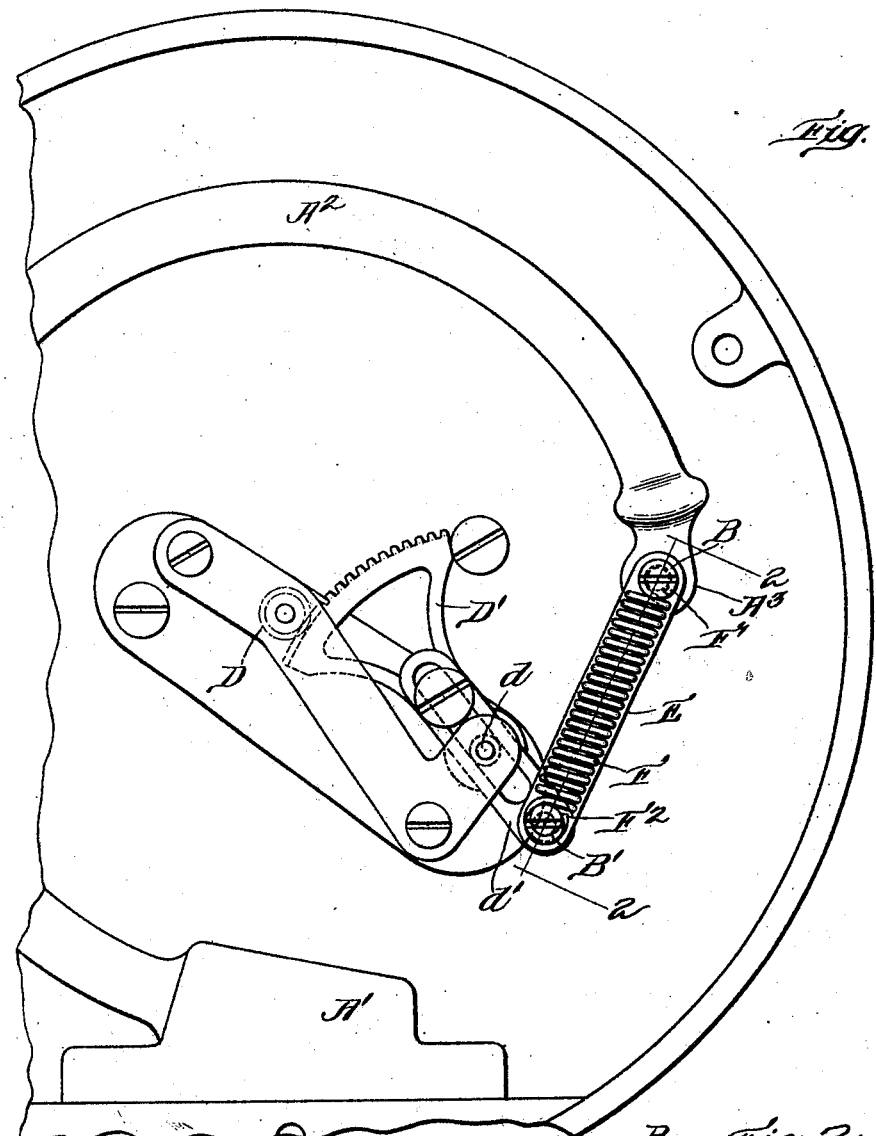
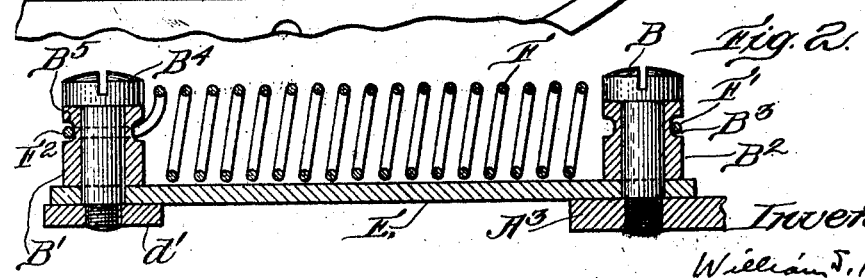
Inventor:
William S. Hudson
by George A. Rockwell
atty.

Patented Jan. 15, 1924.

1,480,684

UNITED STATES PATENT OFFICE.

WILLIAM S. HUDSON, OF WEST MEDFORD, MASSACHUSETTS, ASSIGNOR TO THE ASHTON VALVE COMPANY, OF CAMBRIDGE, MASSACHUSETTS, A CORPORATION OF MASSACHUSETTS.

SPRING LINK.

Application filed October 19, 1922. Serial No. 595,651.

*To all whom it may concern:*

Be it known that I, WILLIAM S. HUDSON, a British subject, and resident of West Medford, in the county of Middlesex and State of Massachusetts, have invented a new and useful Spring Link, of which the following is a specification.

My invention relates to links having openings for operative connection with other elements and the principal object is to reduce wear on the walls of such openings so that accuracy of operation may be preserved.

In the drawing

Figure 1 is a plan of a gauge embodying my invention; and

Figure 2 is an enlarged section on line 2—2 of Figure 1.

As a means of illustrating my invention I have shown in the drawing a pressure gauge in which my invention is embodied but it is to be understood that my invention is useful wherever links are useful.

Within the gauge casing A is socket extension A' from which leads Bourdon tube $A^2$, which has an extension $A^3$, the latter having an internally screw threaded opening to engage the threading of shouldered screw B.

Pinion D is to carry a pointer (not shown) and is operated by sector D' pivoted at $d$ and having at end $d'$ an internally screw threaded opening to engage the threading of shouldered screw $B^4$.

Rigid link E has a circular opening at one end to receive the shank of screw B and at the other end to receive the shank of screw $B^4$. Between link E and the head of screw B and around the shank of the latter is a bushing $B^2$ having annular groove $B^3$ and between link E and the head of screw $B^4$ and around the shank of the latter is a bushing B' having annular groove $B^5$.

Coiled spring F has one end F' engaging groove $B^3$ and its other end $F^2$ engaging groove $B^5$ and this spring always tends to draw the screws toward each other and thereby holds the shanks of the screws firmly against those portions of the openings in the link E which are towards the center of the link E with the result that the tendency to wear away said openings is done away with and consequently the accuracy of operation is very greatly increased and this is a matter of great importance generally but particularly so in the case of pressure gauges where very fine operation and accuracy are required.

What I claim is:

1. A spring link mechanism comprising two movable elements; a rigid link having two openings; a member connected with one of said elements and passing through one of said openings; another member connected with the other of said elements and passing through the other of said openings; and a spring connected to said members and tending to draw them together.

2. A spring link mechanism comprising two movable members; a rigid link having two openings; a screw engaging one of said members and passing through one of said openings; a bushing around the shank of said screw and having an external annular groove; another screw engaging the other of said members and passing through the other of said openings; another bushing around the shank of said other screw and having an external annular groove; and a coiled spring tending to draw said screws together and having one end in engagement with the groove of one of said bushings and the other end in engagement with the groove of the other of said bushings.

WILLIAM S. HUDSON.

Witness:
ADRIAN D. PERRY.